March 14, 1967   G. KRACHT   3,309,440
PROCESS OF PRODUCING FLEXIBLE FOAM POLYSTYRENE PLASTIC SHEETING
Filed Feb. 8, 1963
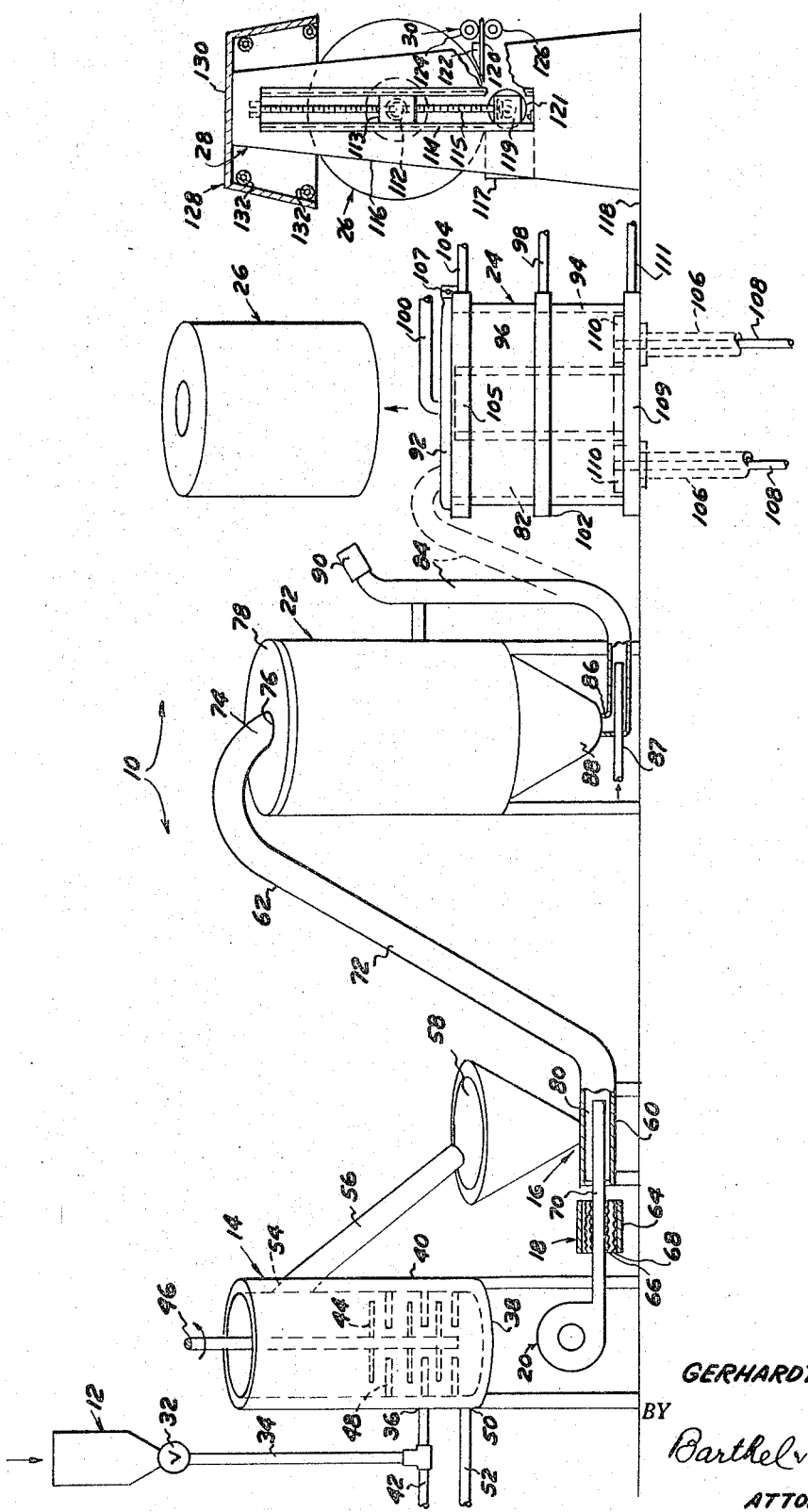
INVENTOR.
GERHARDT KRACHT
BY
Barthel & Bugbee
ATTORNEYS ns
3,309,440
PROCESS OF PRODUCING FLEXIBLE FOAM POLYSTYRENE PLASTIC SHEETING Gerhard Kracht, Allen Park, Mich., assignor to Swedish Crucible Steel Company, Detroit, Mich., a corporation of Michigan
Filed Feb. 8, 1963, Ser. No. 257,224
14 Claims. (Cl. 264—53)

This invention relates to process of producing polystyrene plastic sheets and, in particular, to foam polystyrene plastic sheets.

One object of this invention is to provide a process of making flexible foam or expanded polystyrene plastic sheets wherein the plastic material is maintained at a temperature above room temperature during substantially the entire cycle of operations from the time of pre-expanding the granulated polystyrene plastic material to the formation of the foam plastic sheets, thereby avoiding the stiffening which occurred in prior processes and which rendered such foam plastic sheets brittle and inflexible.

Another object is to provide a process of producing flexible foam polystyrene sheet material which is adapted to be operated continuously upon a mass production scale and which is also adapted to be carried out by apparatus which can be operated almost automatically with a minimum of supervision and labor expenditure.

Another object is to provide a process of producing flexible foam polystyrene material wherein the pre-expanded polystyrene beads produced initially from the granulated polystyrene plastic material are dried by the application of a heating agent, such as hot air, which prevents condensation of the expanding agent within the beads and also prevents the creation of a partial vacuum within the beads by such condensation and thus prevents drawing moisture into the beads from the steam used in pre-expanding the granulated plastic materials into such beads.

Another object is to provide a process of producing flexible foam polystyrene material wherein the re-heating of the foam polystyrene sheet material previously required following the cutting of the sheet material from the molded foam polystyrene cylinder, and the subsequent pressing thereof between rolls is eliminated, where such pressing involves heating the cold sheet of foam plastic beforehand, together with the extended aging time between molding, cutting and rolling by cutting the sheet material from the foam plastic cylinder immediately after it has been removed from the mold and while it is still hot, thereby preventing the sheet material from becoming brittle and rigid, as has heretofore occurred.

Another object is to provide a flexible resilient sheet foam plastic material, such as is produced by the above-mentioned process, which material can be rolled up or wrapped around small diameter objects without fracturing.

Other objects and advantages of the invention will become apparent during the course of the following description of the accompanying drawing which is a flow diagram showing diagrammatically the various steps in the carrying out of the process of the present invention.

Referring to the flow diagram of the drawing, there is illustrated therein an apparatus, generally designated 10, and production layout for carrying out the process of producing flexible polystyrene foam plastic, as including generally a reception hopper 12 for the introduction of the unexpanded polystyrene plastic beads which in appearance and granularity resemble granulated sugar, into a steam pre-expander 14 which, being open to the atmosphere, operates at approximately atmospheric pressure, without confining or compressing the beads at its upper end. The expander 14 discharges the pre-expanded polystyrene beads into a heated compressed air drying conveyor 16. The conveyor 16 includes an electric heater 18 for heating the compressed air supplied from a blower 20, the hot air blast from which simultaneously dries and conveys the pre-expanded polystyrene beads into the top of a storage bin 22. The pre-expanded beads from the bottom of the storage bin 22 are deposited by a hose in an expanding mold 24, whence, after ejection, the resulting molded hollow cylindrical foam plastic body 26 is immediately transferred while still hot to a slicing machine 28, wherein it is cut into sheet form while still shot, and is hot-rolled between opposing rolls in a rolling device 30 attached to the slicing machine 28, whence it emerges in permanently flexible sheet form.

Referring to the drawing in detail, the unexpanded particles of granulated polystyrene plastic material pass downward from the receiving hopper 12 through a valve 32 and descending conduit 34 to an inlet 36 located approximately ten inches from the bottom 38 of the insulated stainless steel drum 40 of the pre-expander 14, into which it is impelled by saturated steam entering through a branch pipe 42 and which also accomplishes the pre-expansion of the particles or unexpanded beads into pre-expanded beads. As the unexpanded beads fall to the bottom of the drum 40, they are agitated by rotary blades or paddles 44 mounted on the lower end of a rotary shaft 46. Alternating between the rotary blades 44 are stationary blades 48 which thoroughly mix the beads during the pre-expansion step of the process. Connected to the drum 40 near the bottom 38 thereof is the inlet 50 of a superheated steam pipe 52, the heat and pressure of which pre-expand the unexpanded plastic beads dropping downward by gravity from the inlet 36. As the unexpanded beads expand under the influence of the heat from the steam from approximate granulated sugar particle size to slightly less than BB shot size, they are moved upward by the expansion and overflow through a drum outlet 54 near the top of the cylinder 40. There they fall through a downwardly-inclined chute 56 into the hopper or receiving cone 58 of the hot air conveyor 16 and thence into the entrance portion 60 of the conveyor conduit 62.

The pre-expanded plastic beads falling into the entrance portion 60 of the heater-conveyor conduit 62 are immediately subjected to the blast of heated compressed air from the blower 20 and electric heater 18, which has a resistance winding 64 supplied with electric current through lines 66 and 68. The hot air blast from the discharge pipe 70 of the blower 20, amplified by the venturi or ejector effect produced by the radial spacing of the discharge pipe 70 from the conveyor pipe entrance portion 60, simultaneously dries the moisture from the pre-expanded beads and shoots upward through the inclined portion 72 of the conveyor conduit 62 and then downward through the downwardly-directed discharge portion 74 thereof through the inlet 76 at the top 78 of the storage bin 22. There the heated pre-expanded beads accumulate and fall downward, to be drawn off at the bottom as needed to successively fill the mold.

The pre-expansion described above takes place in the pre-expander 14 with the beads in an unconfined condition at an elevated temperature of approximately 250° F.

in contrast to the prior art pre-expansion which has been carried out at about 212° F., the boiling point of water at sea level pressure. The hot air used in drying and conveying the beads through the conveyor conduit 62 preferably has a temperature between 100° F. and 300° F. and the pipe portions 60 and 70 conveniently have diameters of 6 inches and 3 inches respectively so as to provide an annular venturi passageway 80 therebetween effecting an ejector or jet pump action.

The pre-expanded plastic beads thus produced and deposited in the storage bin 22 remain there up to six hours. They have densities as low as 0.40 to 0.75 pound per cubic foot and are in a dry condition as a result of the drying action of the hot blast of air which conveyed them upward to the top of the bin 22. The heating procedure just mentioned also prevents condensation of the expanding agent, such as pentane, which is a liquid at room temperature but becomes a gas under the influence of heat, as from the steam. This heating of the pre-expanded beads also maintains the expanding agent in a gaseous condition and by drying the condensed moisture from the steam prevents its introduction into the bead cells, as occurred in prior processes where the beads were allowed to cool while still in a moist condition. The present process, by eliminating such cooling and condensation of the expanding agent and drawing in of the surface moisture into the interiors of the plastic beads, greatly shortens the processing time and renders the resulting product more uniform and of greater flexibility. The heating and drying procedure just described also reduces the so-called agglomeration or lumping of the beads which has long been a serious problem in expanded polystyrene processing.

The original or unexpanded polystyrene granules or beads have a density of approximately 45 pounds per cubic foot and these are pre-expanded in the above manner to one-half to one pound per cubic foot.

The pre-expanded dried beads are transferred from the storage bin 22 to the annular exterior chamber or mold cavity 82 of the mold 24 through a flexible hose 84 connected to an outlet 86 at the bottom 88 of the storage bin 22. This is done by introducing the previously-mentioned hot dry compressed air at said temperature of between 100° F. and 300° F. through the compressed air pipe 87 entering the rearward end of the hose 84 and passing through a venturi injector (not shown) which produces an ejector or jet pump action to propel the beads. The hose 84 has a nozzle 90 through which the pre-expanded beads are deposited in the mold cavity 82, which is preferably filled completely if low density pre-expanded beads are used therein, namely those having densities from 0.40 to 0.75 pound per cubic foot. If the pre-expanded beads are of higher density than 0.75 pound per cubic foot, the mold cavity 82 is not completely filled but is filled from ⅝ to ⅞ of its capacity, thus leaving an expansion space at the top of the mold cavity.

After filling, the hinged cover 92 of the mold 24 is then closed not only upon the top of the cylindrical mold casing 94 but also upon the top of the hollow cylindrical core 96 thereof. Steam at a pressure of approximately 75 pounds per square inch and at 250° F. temperature is then introduced through the screen-lined walls of the casing 86 and core 88 through the steam pipes 98 and 100 leading respectively to an annular manifold 102 opening into the mold cavity 82 and through the cover 92 into the hollow core 96, until the pressure in the cavity 82 reaches a pressure of 15 pounds per square inch, whereupon the steam supply is automatically shut off.

Under the heat and pressure of the steam in the annular mold cavity 82, the pre-expanded beads now expand further to their maximum extent permitted by the intervals or interstices between the beads and also by any space which may have been left at the top of the mold cavity 82. Following complete expansion in the mold cavity 82, which causes the pre-expanded beads to further expand and unite themselves to one another in the form of a hollow cylindrical foam plastic body or block 26, the steam entering the mold cavity 82 through the pipes 98 and 100 is then completely shut off. A cooling agent, such as water or air, is then optionally introduced into the mold cavity 82 by a pipe 104 and annular manifold 105, after which the block 26 is allowed to remain in the mold cavity 82 for several minutes, depending on whether rigid, resilient or flexible sheeting is to be produced. If no cooling agent is introduced, the external bead layers next to the mold walls rupture by reason of the excessive heat they receive therefrom. Condensate drains off in manifold 109 and pipe 111.

During this time, expansion terminates, and the hollow cylindrical molded block 26 contracts slightly, thereby loosening the molded foam plastic block 26 from its previous tight engagement with the walls of the casing 94 and core 96. The cover 92 of the mold 24 is then swung open in an upward direction on its hinges 107, whereupon hydraulic cylinders 106 having their pistons 108 operatively connected to an annular perforated bottom ejector plate or disc 110 raise the disc 110 and the molded plastic foam block 26, stripping the latter from the walls of the core 96 and casing 94. The equilibrium point at which the contraction of the molded block 26 is terminated is that point at which expansion has ceased and hence no post-expansion can occur outside the mold cavity 82, which would lead to deformation of the molded foam plastic cylindrical block 26.

Immediately after the removal of the hollow cylindrical molded foam plastic block 26 from the cavity 82 of the mold 24, it is transferred, while still hot, either to a hot storage chamber (not shown), where it remains for a period of time up to 24 hours at a hot temperature of 100° F. to 200° F., or while still at a hot temperature of 100° F. to 200° F. directly to the supporting mandrel or shaft 112 of the slicing machine 28 for cutting into sheet material.

The shaft 112 of the slicing machine 28 is rotatably supported in bearing blocks 113 internally threaded to be propelled vertically along guideways 114 by screw shafts 115 (one only being shown) which in turn are rotatably supported in axially-spaced standards 116 (one only being shown) rising from the floor 118. The bearing blocks 113 are moved downwardly at a feeding speed by the screw shafts 115 which are driven in timed relationship with an electric motor 117 which drivingly rotates the shaft 114 through reduction gearing 119. The hollow cylindrical block 26 is engaged and sliced into a foam plastic sheet or web 120 by a bar knife 122 mounted on the standards 116 while the block 26 is still hot. In the meantime, the block 26 is pressed downward by the feeding action of the screw shafts 115 on the bearing blocks 113 against and rotated by a knurled pressure roller 121 rotatably mounted on the standards 116 beneath the bar knife 122 and driven by the motor 117 and reduction gearing 119. The foam plastic sheet or web 120 which emerges from the bar knife 122 passes immediately between the upper and lower compression rollers 124 and 126 of the rolling device 30, enhancing further the flexibility of the foam plastic sheet 120 and rendering its surfaces smooth by flattening out the differently-sized surface craters left after cutting through foam cells of different diameters.

The block 26, while in the slicing machine 28, is maintained in a heated condition by a heating apparatus 128 shown diagrammatically in cross-section as mounted on top of the standards 116. The heating apparatus 128 includes a closed-ended hood 130 extending the entire length of the foam plastic block 26 and overhanging it at its opposite ends. Mounted inside the hood 130 are multiple elongated heating units 132 which radiate heat downward onto the foam plastic block 26 and maintain the latter in a heated condition. Such heating prevents condensation of the blowing agent or moisture within the now fully expanded beads of which block 26 is composed, and consequently prevents shrinkage or contraction or deformation of the foam plastic block 26 during the cutting or slicing operation or during interruption thereof.

The foam plastic sheet or web 120 after its emergence from between the rollers 124 and 126 may be wound spirally upon the shaft or mandrel of a conventional rewind machine (not shown) driven in timed relationship with the cutting machine 28 so as to prevent either excessive slackness or tautness of the foam plastic sheet of web 120 being wound. In the alternative, where additional resilience is desired, possibly with some reduction of flexibility, the foam plastic sheet or web 120 may be passed through a heating apparatus, such as that described and claimed in the copending application Ser. No. 173,-739 filed Feb. 16, 1962, now Patent No. 3,200,437 by Alvin M. Sasanko for Method and Apparatus for Rendering Polystyrene Sheet Material Flexible at a hot temperature of 150° F. to 180° F. According to the present invention, the foam plastic sheet or web 120 may be produced in extremely great lengths from a single foam plastic block 26. For example, approximately 6000 linear feet of such foam plastic sheeting having a thickness of 1/32 of an inch may be cut from a foam plastic block 48 inches in length and having outer and inner diameters of 60 inches and 20 inches respectively. Moreover, by heat splicing the rearward end of such a foam plastic sheet or web 120 to the forward end of another web or sheet 120 emerging from a new foam plastic block 26 being cut in the cutting machine 28, a continuous web of such sheet material of unlimited length can be produced by the present process.

The superheated steam introduced during pre-expansion through the lower pipe 52 into the bottom of the pre-expander drum 40 is at approximately 75 pounds per square inch pressure and about 250° F. temperature, whereas the saturated steam introduced therein through the upper pipe 42 is at approximately atmospheric pressure and approximately boiling water temperature of about 212° F.

The styrenepolymers useful in this invention include homopolymers of styrene and co-polymers of styrene that contain at least 50% by weight of the styrene and mixtures of various styrene polymers. Examples of monomers that can be co-polymerized with styrene include the conjugated 1,3 dienes, such as butadiene and isoprene, alpha-beta unsaturated monocarboxylic acid and derivatives thereof such as acrylic acid, ethylacrylate, and the like. The corresponding esters of metacrylic acid such as acrylamine, methacrylamine, acrylonitrile, vinyl esters of aliphatic and aromatic carboxylic acids such as vinyl carbozole and vinyl caprolactone.

Also included herein are mixtures of various polymers with styrene polymers, such as, for example, blends of styrene polymers with rubber diene polymers. In general, the styrene polymers employed should have molecular weights in the range of 40.000 to 80.000 as determined by the Staudinger method.

The expanding agent is preferably an organic compound which has a boiling point below the softening point of the polymer; particularly useful are pentane, hexane, heptane, petroleum ether, cyclopentane, cyclohexane and other saturated aliphatic and cycloaliphatic volatile liquids.

What I claim is:

1. A process of producing flexible resilient foam polystyrene plastic material, comprising pre-expanding granules of expansible styrene polymer plastic material containing an expanding agent by applying steam thereto within a vertically-unconfined pre-expansion space at an elevated temperature substantially higher than 212° F. into particles larger than said granules and of much lower density than said granules yet possessing further expansibility, applying to the thus pre-expanded particles a substantially dry heat at a drying temperature of 100° F. to 300° F. whereby to remove condensed steam from said particles and cause air to enter therein while also preventing condensation of the expanding agent therein, further expanding and molding the thus pre-expanded heated particles in a closed molding chamber at a pressure higher than atmospheric pressure and at a temperature higher than 212° F. into a molded foam plastic body of predetermined configuration, removing the thus molded foam plastic body from the molding chamber while said body remains at a hot temperature of 100° F. to 200° F., and severing foam plastic sheeting from said body while said body remains at said hot temperature of 100° F. to 200° F.

2. A process, according to claim 1, wherein said elevated temperature of pre-expansion is approximately 250° F.

3. A process, according to claim 1, wherein said hot body is stored after its removal from the molding chamber and additional heat is supplied thereto during such storage sufficient to maintain said hot temperature within a range of 100° F. to 200° F.

4. A process, according to claim 1, wherein said body is maintained at said warm temperature for a period of time up to 24 hours.

5. A process, according to claim 1, wherein said material is severed from said body substantially immediately after the removal of said hot body from said molding chamber while said hot body is still at said hot temperature within a range of 100° F. to 200° F.

6. A process, according to claim 1, wherein the sheeting is in the form of a greatly elongated foam plastic web.

7. A process, according to claim 1, wherein said severing comprises cutting said hot body into sheeting while applying pressure thereto in the vicinity of the cutting location.

8. A process, according to claim 1, including the additional step of applying additional external heat to said hot body to reduce shrinkage thereof while severing said foam plastic sheeting from said body.

9. A process, according to claim 1, including the additional step of further compressing the foam plastic sheeting while still hot immediately following the severing thereof from said body whereby to increase its resilience and render its surfaces smooth.

10. A process, according to claim 1, including the additional step of further subjecting the foam plastic sheeting to heat at an elevated temperature range of 150° F. to 180° F. following the severing thereof from said body whereby to further reduce the density of the material and increase the resilience thereof.

11. A process, according to claim 1, including the further step of conveying the pre-expanded particles to a location adjacent the molding chamber while applying said substantially dry heat of 100° F. to 300° F. thereto.

12. A process, according to claim 1, wherein the molding chamber is only partially filled with the pre-expanded particles and wherein further expansion thereof occurs within said molding chamber.

13. A process, according to claim 1, wherein the molding chamber is of approximately cylindrical configuration and wherein the molded body after molding is pushed out of the cylindrical molding chamber.

14. A process, acording to claim 1, wherein a cooling agent is applied to the molded body while still in the molding chamber whereby to effect partial cooling and slight shrinkage thereof prior to the removal thereof from said molding chamber.

(References on following page)

References Cited by the Examiner

UNITED STATES PATENTS 2,126,435  8/1938  Weisenburg _____ 18—48
2,756,461  7/1956  Hadley _____ 18—55
3,013,996  12/1961  Pollard et al.
3,082,483  3/1963  Bickford.

OTHER REFERENCES

BASF booklet, No. 2: "Die Verarbeitung von Styropor zu Schaumstoffen," May 1960, pages 48–49, the section: "IX. Flexible (elastische) Platten, Bander u. dgl."

BASF booklet, No. 1: "Former and Vorrichtungen zur Verarbeitung von Styropor," by Fritz Stastney (reprinted from Der Plastverarbeiter, September 1954, Seite 260–271). In the reprint see pages 7–9, the section: "Schneider, Bohren, Sagen u. dgl."

ALEXANDER H. BRODMERKEL, *Primary Examiner.*

P. E. ANDERSON, *Assistant Examiner.*